(12) United States Patent
Qian et al.

(10) Patent No.: US 12,217,154 B2
(45) Date of Patent: Feb. 4, 2025

(54) METHOD AND APPARATUS WITH NEURAL NETWORK OPERATION AND KEYWORD SPOTTING

(71) Applicants: SAMSUNG ELECTRONICS CO., LTD., Suwon-si (KR); Seoul National University R&DB Foundation, Seoul (KR)

(72) Inventors: Xue Qian, Seoul (KR); Jin Hwan Park, Seoul (KR); Wonyong Sung, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 968 days.

(21) Appl. No.: 17/229,273

(22) Filed: Apr. 13, 2021

(65) Prior Publication Data
US 2022/0172028 A1 Jun. 2, 2022

(30) Foreign Application Priority Data
Dec. 2, 2020 (KR) .................. 10-2020-0166908

(51) Int. Cl.
*G06F 5/01* (2006.01)
*G06F 17/15* (2006.01)
(Continued)

(52) U.S. Cl.
CPC ............. *G06N 3/048* (2023.01); *G06F 5/01* (2013.01); *G06F 17/153* (2013.01); *G06F 17/16* (2013.01); *G06F 40/279* (2020.01)

(58) Field of Classification Search
CPC .......... G06F 5/01; G06F 17/153; G06F 17/16; G06F 40/279; G06N 3/044; G06N 3/045;
(Continued)

(56) References Cited

U.S. PATENT DOCUMENTS 9,600,231 B1  3/2017  Sun et al.
9,672,815 B2  6/2017  Ganapathiraju et al.
(Continued)

FOREIGN PATENT DOCUMENTS

CN  110472531 A     11/2019
CN  110674987 A  *  1/2020
(Continued)

OTHER PUBLICATIONS

Choi, Seungwoo, et al. "Temporal convolution for real-time keyword spotting on mobile devices." arXiv preprint arXiv:1904.03814 (2019) (5 pages in English).
(Continued)

*Primary Examiner* — Tan V Mai
(74) *Attorney, Agent, or Firm* — NSIP Law

(57) ABSTRACT

A neural network operation method includes: receiving an input vector sequence including a plurality of channels; performing a first convolution operation on a first input vector of the input vector sequence; and performing a second convolution operation on a second input vector of the input vector sequence that is adjacent to the first input vector in a channel direction.

24 Claims, 6 Drawing Sheets

(51) Int. Cl.
  *G06F 17/16*   (2006.01)
  *G06F 40/279*  (2020.01)
  *G06N 3/048*   (2023.01)

(58) Field of Classification Search
  CPC . G06N 3/08; G06N 3/04; G06N 3/063; G10L 2015/088; G10L 15/16
  USPC ........................................................ 708/205
  See application file for complete search history.

(56) References Cited

U.S. PATENT DOCUMENTS

| | | | |
|---|---|---|---|
| 9,754,584 B2 | 9/2017 | Parada San Martin et al. | |
| 2022/0051476 A1* | 2/2022 | Woop | G06T 3/4007 |
| 2022/0083844 A1* | 3/2022 | Khaitan | G06F 9/3891 |

FOREIGN PATENT DOCUMENTS

| | | | |
|---|---|---|---|
| CN | 110728308 A | 1/2020 | |
| CN | 111340208 A | 6/2020 | |
| JP | 2020-27659 A | 2/2020 | |

OTHER PUBLICATIONS

Zhang, Yundong, et al. "Hello edge: Keyword spotting on microcontrollers." arXiv preprint arXiv:1711.07128 (2017) (14 pages in English).

Derr, Tyler, Yao Ma, and Jillang Tang. "Signed graph convolutional networks." 2018 IEEE International Conference on Data Mining (ICDM). IEEE, 2018 (10 pages in English).

"IEEE automatic speech recognition and understanding workshop" Dec. 14-18, 2019, Sentosa, Singapore, Asru 2019 (1-162)(162 pages in English).

Lee, Lukas, Jinhwan Park, and Wonyong Sung. "Simple gated convnet for small footprint acoustic modeling," 2019 IEEE Automatic Speech Recognition and Understanding Workshop (ASRU). IEEE, 2019. (7 pages in English).

"Low-Latency Lightweight Streaming Speech Recognition With 8-Bit Quantized Simple Gated Convolutional Neural Networks" May 4, 2020 (163-167)(5 pages in English).

"Simple Depthwise Convolutional Neural Network for Efficient Keyword Spotting" Aug. 1, 2020 (168-216)(48 pages in English).

* cited by examiner

METHOD AND APPARATUS WITH NEURAL NETWORK OPERATION AND KEYWORD SPOTTING

CROSS-REFERENCE TO RELATED APPLICATIONS

This application claims the benefit under 35 USC § 119(a) of Korean Patent Application No. 10-2020-0166908 filed on Dec. 2, 2020, in the Korean Intellectual Property Office, the entire disclosure of which is incorporated herein by reference for all purposes.

BACKGROUND

1. Field

The following description relates to a method and apparatus with a neural network operation and keyword spotting.

2. Description of Related Art

Keyword spotting may be a first step performed for a voice-based human-computer interactive interface, and a high level of accuracy thereof may thus be desired. Also, due to permanent operation, hardware that is operation-effective and operates with low power may be desired.

Keyword spotting using an initial neural network may use a neural network model, such as, for example, a long short-term memory (LSTM) and a time-delay neural network (TDNN). Recently, there is ongoing research on a method using a model such as a convolutional neural network (CNN) and a residual network (ResNet) for high accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network operation method includes: receiving an input vector sequence including a plurality of channels; performing a first convolution operation on a first input vector of the input vector sequence; and performing a second convolution operation on a second input vector of the input vector sequence that is adjacent to the first input vector in a channel direction.

The performing of the first convolution operation may include performing a temporal convolution on the first input vector with a filter having a preset length on a time axis.

The first convolution operation and the second convolution operation may respectively include a one-dimensional (1D) convolution operation.

The performing of the second convolution operation may include performing the second convolution operation on one or more second input vectors, including the second input vector, that are separate from the first input vector by a distance less than or equal to a preset distance in the channel direction.

The preset distance may have a value less than a dimension of the first input vector.

The method may include: performing a batch normalization operation based on a result of the second convolution operation; and performing a first activation operation based on a result of the batch normalization operation.

The performing of the first activation operation may include performing a rectified linear unit (ReLU) operation based on the result of the batch normalization operation.

The method may include: adding the first input vector and a result of the first activation operation; and performing a second activation operation based on a result of the adding.

The method may include: performing a pooling operation based on a result of the second activation operation; and performing a fully-connected operation based on a result of the pooling operation.

A non-transitory computer-readable storage medium may store instructions that, when executed by a processor, configure the processor to perform the method.

In another general aspect, a neural network operation apparatus includes: a receiver configured to receive an input vector sequence including a plurality of channels; and a processor configured to: perform a first convolution operation on a first input vector of the input vector sequence; and perform a second convolution operation on a second input vector of the input vector sequence that is adjacent to the first input vector in a channel direction.

For the performing of the first convolution operation, the processor may be configured to perform a temporal convolution on the first input vector with a filter having a preset length on a time axis.

The first convolution operation and the second convolution operation may respectively include a one-dimensional (1D) convolution operation.

For the performing of the second convolution operation, the processor may be configured to perform the second convolution operation on one or more second input vectors, including the second input vector, that are separate from the first input vector by a distance less than or equal to a preset distance in the channel direction.

The preset distance may have a value less than a dimension of the first input vector.

The processor may be configured to: perform a batch normalization operation based on a result of the second convolution operation; and perform a first activation operation based on a result of the batch normalization operation.

The processor may be configured to perform a rectified linear unit (ReLU) operation based on the result of the batch normalization operation.

The processor may be configured to: add the first input vector and a result of the first activation operation; and perform a second activation operation based on a result of the adding.

The processor may be configured to: perform a pooling operation based on a result of the second activation operation; and perform a fully-connected operation based on a result of the pooling operation.

In another general aspect, a keyword spotting method includes: receiving a natural language; performing a first convolution operation on a first input vector of an input vector sequence including a plurality of channels based on the received natural language; performing a second convolution operation on a second input vector of the input vector sequence that is adjacent to the first input vector in a channel direction; and detecting a keyword included in the natural language based on a result of the second convolution operation.

The performing of the first convolution operation may include generating the input vector sequence by extracting a feature from the natural language.

In another general aspect, a neural network operation method includes: performing a first convolution and a second convolution respectively on a first input vector and second input vector of an input vector sequence, wherein the first and second input vectors are separated from each other in a channel direction; performing a first activation based on the second convolution; adding the first input vector and a result of the first activation; performing a second activation based on the adding; and performing a fully-connected operation based on the second activation.

The performing of the first activation may include: performing a batch normalization based on a result of the second convolution; and performing the first activation based on a result of the batch normalization.

The performing of the fully-connected operation may include: performing a pooling based on a result of the second activation; and performing the fully-connected operation based on the result of the pooling.

Other features and aspects will be apparent from the following detailed description, the drawings, and the claims.

Figure 1:
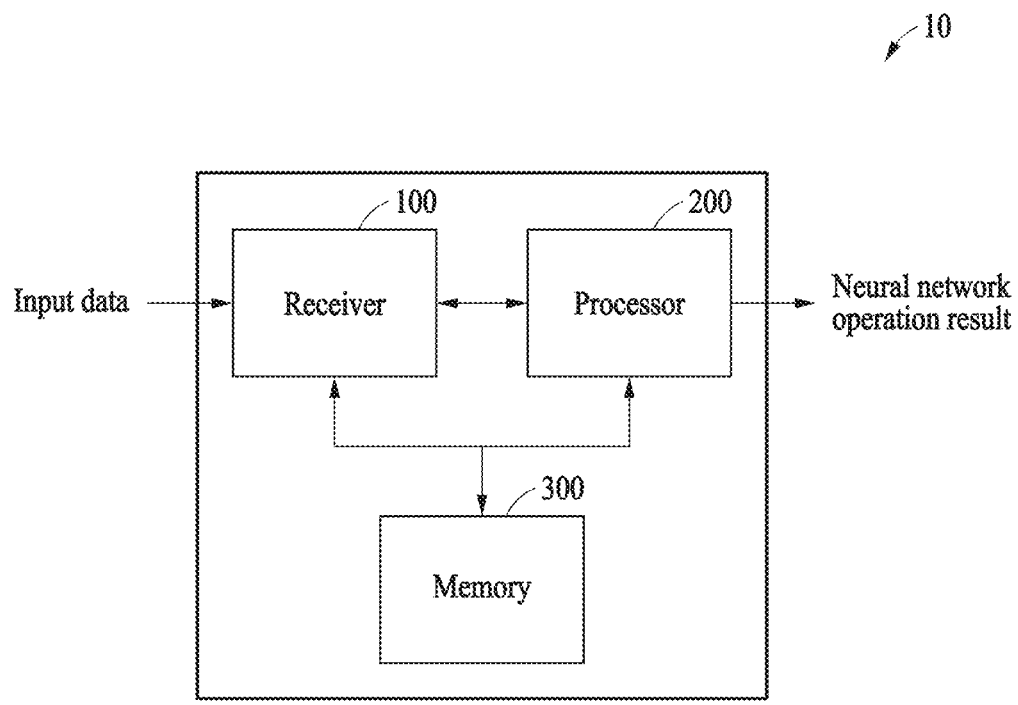
FIG. 1 illustrates an example of a neural network operation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "on," "connected to," or "coupled to" another component, it may be directly "on," "connected to," or "coupled to" the other component, or there may be one or more other components intervening therebetween. In contrast, when an element is described as being "directly on," "directly connected to," or "directly coupled to" another element, there are no other components intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of a neural network operation apparatus.

Referring to FIG. 1, a neural network operation apparatus 10 may perform a neural network operation. The neural network operation described herein may refer to an operation or computation of a neural network. The neural network operation apparatus 10 may perform the neural network operation based on input data. The neural network operation apparatus 10 may process the input data and output a result of the neural network operation.

The neural network may include a statistical learning algorithm in machine learning and cognitive science. The neural network may indicate an overall model having a problem-solving ability as nodes constituting the network through synaptic connections change an intensity of the synaptic connections through learning.

A node of the neural network may include a combination of weights and/or biases. The neural network may include one or more layers including one or more nodes or nodes. The neural network may infer a result to be predicted from an input by changing a weight of a node through learning.

The neural network may include a deep neural network (DNN). For example, the neural network may include a convolutional neural network (CNN), a recurrent neural network (RNN), a perceptron, a multilayer perceptron, a feedforward (FF) network, a radial basis function (RBF) network, a deep FF (DFF) network, an LSTM, a gated recurrent unit (GRU), an autoencoder (AE), a variational AE (VAE), a denoising AE (DAE), a sparse AE (SAE), a Markov chain (MC), a Hopfield network (HN), a Boltzmann machine (BM), a restricted BM (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network (AN).

The neural network operation apparatus 10 may include a receiver 100 and a processor 200 (for example, one or more processors). The neural network operation apparatus 10 further may include a memory 300 (for example, one or more memories).

The receiver 100 may include a receiving interface. The receiver 100 may receive the input data. For example, the receiver 100 may receive a sequence of input vectors including a plurality of channels. The sequence of input vectors will be referred to herein as an input vector sequence. The receiver 200 may output the received input data to the processor 200.

A non-limiting example of a detailed form of the input vector sequence will be described below with reference to FIGS. 3 and 4.

The processor 200 may process data stored in the memory 300. The processor 200 may execute a computer-readable code stored in the memory 300 and instructions induced by the processor 200.

The processor 200 may be a hardware data processing device having a circuit of a physical structure to execute desired operations. The desired operations may include, for example, a code or instructions included in a program.

The data processing device may include, for example, a microprocessor, a central processing unit (CPU), a processor core, a multicore processor, a multiprocessor, an application-specific integrated circuit (ASIC), and/or a field-programmable gate array (FPGA).

The processor 200 may train the neural network. The processor 200 may train the neural network based on the input data, and may perform the neural network operation based on the trained neural network.

In an example, the processor 200 may perform a first convolution operation on a first input vector of the input vector sequence. For example, the processor 200 may perform a temporal convolution on the first input vector with a filter having a preset length on a time axis.

The temporal convolution may refer to a convolution that uses a casual convolution and dilation, and is thus of a type that is suitable for sequential data having temporality and a large receptive field.

The processor 200 may perform a second convolution operation on a second input vector of the input vector sequence that is adjacent to the first input vector in a channel direction (where the first input vector is of a channel and the second input vector is of another channel, for example).

The first convolution operation and the second convolution operation may include a one-dimensional (1D) convolution operation. However, examples are not limited to the foregoing, and the first convolution operation and the second convolution operation may use a two-dimensional (2D) convolution operation or omit the operation.

The processor 200 may perform the second convolution operation on at least one second input vector that is separate from the first input vector in the channel direction by a distance less than or equal to a preset distance. The preset distance may have a value less than a dimension of the first input vector.

The processor 200 may perform a batch normalization operation based on a result of the second convolution operation. The processor 200 may perform a first activation operation based on a result of the batch normalization operation. For example, the processor 200 may perform a rectified linear unit (ReLU) operation based on the result of the batch normalization operation.

The processor 200 may add the first input vector and a result of the first activation operation. For example, the processor 200 may perform a residual operation that adds an input and an output of the neural network or a layer included in the neural network. A non-limiting example of the residual operation will be described in detail below with reference to FIG. 4.

The processor 200 may perform a second activation operation based on a result of the adding. The first activation operation and the second activation operation may be performed based on a nonlinear activation function. The non-linear activation function may include, for example, a ReLU, a leaky ReLU, a parametric ReLU, softmax, sigmoid, tanh, an exponential linear unit (ELU), and a softplus function.

The processor 200 may perform a pooling operation based on a result of the second activation operation. The pooling operation may refer to an operation that extracts only a portion of components from a region of the input data corresponding to a kernel size. The pooling operation may include, for example, any of a max pool operation, an average pool operation, and a sum pool operation.

The processor 200 may perform a fully-connected operation based on a result of the pooling operation. The fully-connected operation may refer to an operation that is performed by a fully-connected layer of the neural network. The fully-connected layer may be a layer in which all nodes of the layer are connected to all nodes of a subsequent layer, and/or in which all nodes of a previous layer are connected to all nodes of the layer.

The memory 300 may store the neural network model or parameters of the neural network model. The memory 300 may store instructions (or a program) executable by the processor 200. For example, the instructions may include instructions for performing operations of the processor 200 and/or operations of components of the processor 200.

The memory 300 may be or include a volatile and/or nonvolatile memory device.

The volatile memory device may be or include, for example, a dynamic random-access memory (DRAM), a static RAM (SRAM), a thyristor RAM (T-RAM), a zero-capacitor RAM (Z-RAM), and/or a twin-transistor RAM (TTRAM).

The nonvolatile memory device may be or include, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, and/or an insulator resistance change memory.

Figure 2:
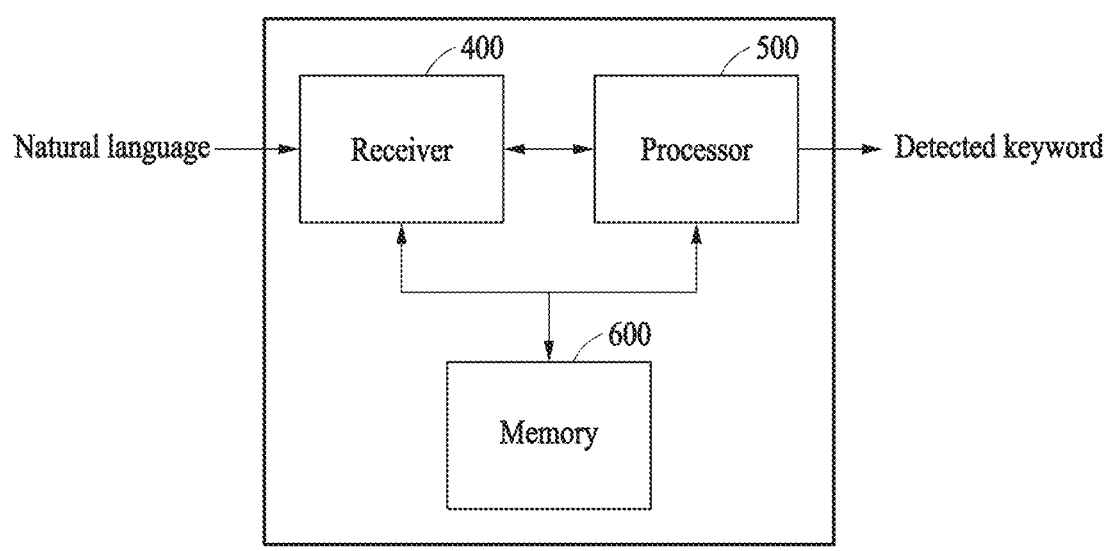
FIG. 2 illustrates an example of a keyword spotting apparatus.

FIG. 2 illustrates an example of a keyword spotting apparatus.

Referring to FIG. 2, a keyword spotting apparatus 30 may spot a keyword in a natural language. The term "spot" or "spotting" used herein may also be referred to as "detect" or "detecting" interchangeably. The keyword spotting apparatus 30 may detect the keyword by processing the natural language using a neural network.

The keyword spotting apparatus 30 may be or include a printed circuit board (PCB) such as a motherboard, an integrated circuit (IC), and/or a system on a chip (SoC). The keyword spotting apparatus 30 may be or include an application processor, for example.

In addition, the keyword spotting apparatus 30 may be, or be included in, a personal computer (PC), a data server, and/or a portable device.

The portable device may be include, for example, a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, a smart device, and/or the like. The smart device may be or include, for example, a smart watch, a smart band, and/or a smart ring.

The keyword spotting apparatus 30 may perform keyword spotting using the neural network operation apparatus 10 of FIG. 1. For example, the keyword spotting apparatus 30 may include the neural network operation apparatus 10 of FIG. 1. Alternatively, the keyword spotting apparatus 30 may perform keyword spotting using separate hardware.

The keyword spotting apparatus 30 may include a receiver 400 and a processor 500 (for example, one or more processors). The keyword spotting apparatus 30 further may include a memory 600 (for example, one or more memories).

The receiver 400 may receive a natural language. The receiver 400 may include a receiving interface. The receiver 400 may output the received natural language to the processor 500.

The processor 500 may generate an input vector sequence by extracting a feature from the natural language. The input vector sequence may include a plurality of channels. The processor 500 may perform a first convolution operation on a first input vector of the input vector sequence including the channels based on the natural language.

The processor 500 may perform a second convolution operation on a second input vector of the input vector sequence that is adjacent to the first input vector in a channel direction.

The processor 500 may detect a keyword included in the natural language based on a result of the second convolution operation. Hereinafter, a non-limiting example of keyword spotting will be described in detail with reference to FIG. 5.

The processor 500 may perform the first convolution and the second convolution in the same way as the processor 200 performs the first convolution and the second convolution, as described above. For a detailed description of the processor 500, reference may be made to what has been described above regarding the processor 200, and thus a more detailed and repeated description will be omitted here for brevity.

The memory 600 may also operate the same as the memory 300 operates, as described above, and thus a more detailed and repeated description of the memory 600 will be omitted here for brevity.

Figure 3:
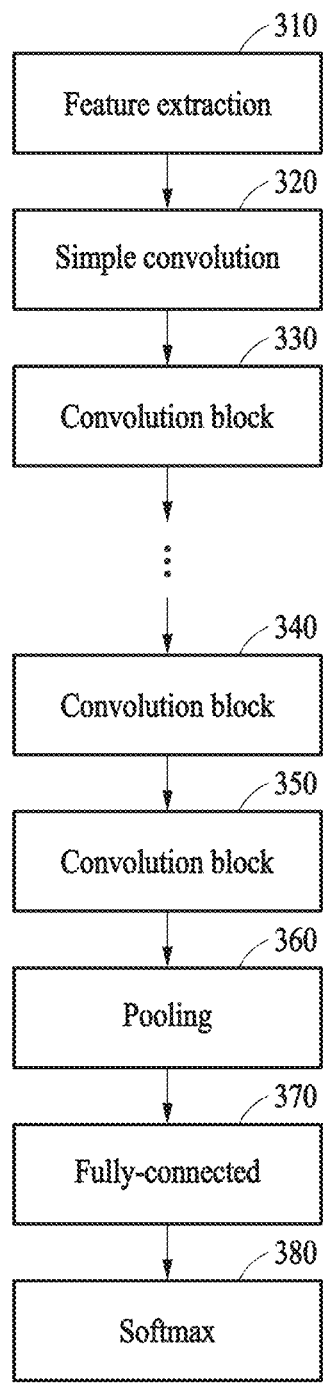
FIG. 3 illustrates an example of a neural network architecture used by a neural network operation apparatus.

FIG. 3 illustrates an example of a neural network architecture used by a neural network operation apparatus (for example, the neural network operation apparatus 10 of FIG. 1). FIG. 4 illustrates an example of a convolution block (for example, a convolution block illustrated in FIG. 3).

Figure 4:
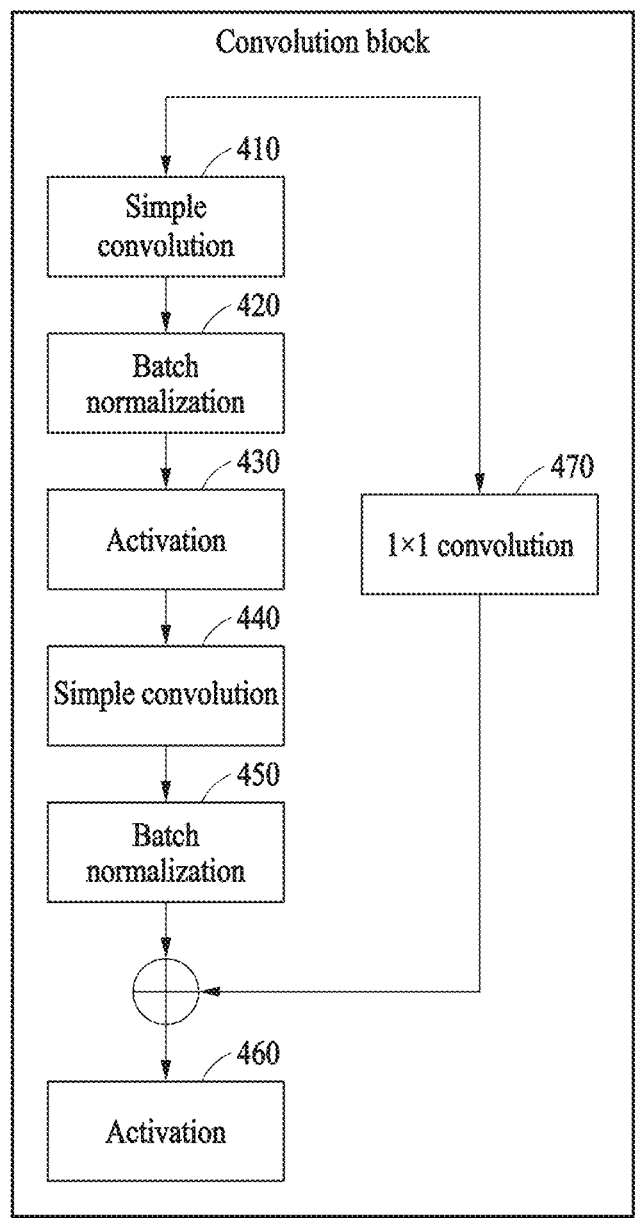
FIG. 4 illustrates an example of a convolution block.

Referring to FIGS. 3 and 4, a processor (e.g., the processor 200 of FIG. 1 and/or the processor 500 of FIG. 2) may perform a neural network operation using a neural network of an architecture illustrated in FIG. 3. The processor may perform sequence learning using a multi-layered convolution and a gating mechanism.

The neural network may include a feature extraction layer 310, a simple convolution layer 320, convolution blocks 330 through 350, a pooling layer 360, a fully-connected layer 370, and a softmax function 380.

The neural network may have the convolution blocks 330 through 350 as a basic component unit.

The convolution blocks 330 through 350 may each include a simple convolution layer 410, a batch normalization 420, an activation 430, a simple convolution layer 440, a batch normalization 450, an activation 460, and a 1×1 convolution layer 470. The processor may perform the activation 460 by adding an input of the simple convolution layer 410 that is from the 1×1 convolution layer 470 and an output of the batch normalization 450, for a residual architecture.

By adding such a residual connection, the processor of one or more embodiments may prevent a gradient from extremely decreasing.

The processor may perform feature extraction from input data using the feature extraction layer 310. The processor may extract a feature associated with a frequency of the input data using the feature extraction layer 310.

The processor may extract the feature associated with the frequency of the input data using filter-bank energy, spectrogram, and/or linear predictive coding (LPC) in the feature extraction layer 310.

For example, when the input data is a speech signal included in a natural language, the processor may extract a feature from the speech signal. The feature may have a form of a vector.

In this example, the processor may divide the input speech signal into 10 milliseconds (ms)-interval frames using a 30 ms window, and then extract a Mel-frequency cepstral coefficient (MFCC) of 40 dimensions from each of the frames. That is, an input vector described herein may have a form of an MFCC vector extracted from a natural language.

The processor may perform a simple convolution based on the extracted feature, using the simple convolution layer 320. The simple convolution layer 320 may include a first convolution operation and a second convolution operation. The simple convolution layer 320 may include a simple depth-wise convolution operation.

To perform a typical convolution operation, a depth-wise convolution operation and a point-wise convolution operation may be used together. However, the processor of one or more embodiments may perform the depth-wise convolution operation without performing the point-wise convolution operation, and may perform a simple convolution based on neighboring features to prevent performance degradation and reduce the number of parameters. Thus, the processor of one or more embodiments may reduce the operation amount and/or computational amount.

Hereinafter, a non-limiting example of how the simple convolution layer 320 may operate will be described in detail with reference to Equations 1 through 3.

Through the simple convolution layer 320, the processor may perform the first convolution operation on a first input vector in a longitudinal direction of a context, and may perform the second convolution operation on a second input vector that is adjacent to the first input vector in a channel direction.

The processor may process an output of the simple convolution layer 320 using the convolution blocks 330 through 350. The processor (e.g., the processor 200) may perform a pooling operation by inputting the convolution block 350, or a result thereof, to the pooling layer 360. The processor 200 may input a result of the pooling operation to the fully-connected layer 370. The processor 200 may apply the softmax function 380 to an output of the fully-connected layer 370.

The processor may perform a convolution based on an input vector and neighboring vectors of the input vector through the simple convolution layer 410. Through the simple convolution layer 410, the processor may perform the first convolution operation on the first input vector in the longitudinal direction of the context, and perform the second convolution operation on the second input data that is adjacent to the first input vector in the channel direction.

To improve an overall performance of the neural network, the processor may perform the batch normalization 420. The processor may perform the batch normalization 420 between a convolution operation and an activation operation. Here, depending on an example batch, another normalization operation may be performed in replacement.

Hereinafter, a non-limiting example of a neural network operation performed by the processor will be described in detail.

The processor may perform an operation of Equation 1 below through the neural network, for example.

$$h^l(X^l) = (X^l * W^l + b^l) \odot \sigma(X^l * V^l + c^l) \quad \text{Equation 1}$$

In Equation 1, $\odot$ denotes an element-wise multiplication, $\sigma$ denotes a sigmoid function, and $*$ denotes a convolution operation.

For example, the neural network may include L layers. In this example, $l=0, 1, 2, 3, \ldots, L-1$. $W^l, V^l \in \mathbb{R}^{T \times 1 \times D \times D}$, and $b^l, c^l \in \mathbb{R}^D$, in which T denotes a filter length and D denotes a feature dimension.

In a case in which a batch size is N, $X^l \in \mathbb{R}^{N \times 1 \times D \times D}$ may represent an input tensor or an input vector. In addition, $h_l$ denotes an output of a l-th layer or an input of a subsequent layer (e.g., an l+1th layer).

The shape of $W^l$ and $V^l$ may be the same as [T, 1, D, D], and the size of the neural network model may be proportional to the filter length T with respect to the given D. In an example, $V^l$ may represent a filter having the filter length T. T may be construed as a context length in each layer.

When using a typical convolution operation, the number of parameters may be $2TD^2$. However, the processor of one or more embodiments may reduce the number of parameters used for a single layer up to $2D^2$ using a simple depth-wise convolution operation.

The processor of one or more embodiments may perform a neural network operation using a 1D depth-wise convolution that observes a sequence with a length while consuming a relatively fewer number of parameters than a typical convolution.

The processor (e.g., the processor 200) may apply such a depth-wise convolution to technical fields such as vision, machine translation, and speech recognition. The processor 200 may perform a 1D convolution operation as represented by Equation 2 below, for example.

$$h^l_{t,1,d} = \sum_{i=\lfloor -T'/2 \rfloor}^{\lfloor T'/2 \rfloor} F^l_{i,1,d} X^l_{t+i-1,1,d} \quad \text{Equation 2}$$

Equation 2 represents a convolution operation in a t-th time step. In Equation 2, $F^l \in \mathbb{R}^{T' \times 1 \times D}$ denotes a filter matrix or a weight matrix of a 1D depth-wise convolution. T' denotes a context length covered by a 1D depth-wise convolution layer. The number of parameters required for the 1D depth-wise convolution of Equation 2 may be T'D.

According to Equations 1 and 2, a total number of parameters used in each layer may be $2D^2+T'D$. The size of D may correspond to several hundred and the size of T' may be less than 20, and thus $2D^2+T'D$ may have a value that is considerably less than $2TD^2$ which is the number of parameters in a neural network using a typical depth-wise convolution.

That is, the processor of one or more embodiments may effectively perform a neural network operation by reducing the number of parameters used for the neural network operation.

Through the simple depth-wise convolution, the processor may perform the convolution operation by considering the neighboring features all at once. For example, the processor may perform the 1D depth-wise convolution based on a plurality of neighboring channels. Hereinafter, the number of neighboring channels to be considered is assumed as K.

The neighboring channels may correspond to input vectors positioned within a preset distance from an input vector corresponding to a certain channel. The processor may experimentally determine the distance.

The processor may perform the 1D depth-wise convolution operation while fixing the size of an input and an output by padding both ends of a feature map with 0.

The processor may perform the simple convolution operation as represented by Equation 3 below, for example. For example, the processor may perform the simple convolution operation by performing the 1D convolution operation based on the neighboring features.

$$h_{t,1,d}^l = \sum_{w=\lfloor-(K-1)/2\rfloor}^{\lfloor(K-1)/2\rfloor} \sum_{i=\lfloor-T'/2\rfloor}^{\lfloor T'/2\rfloor} F_{i,1,d,w}^l X_{t+i-1,1,d+w}^l \quad \text{Equation 3}$$

As represented by Equation 3 above, the processor may perform the first convolution operation based on the context length, and perform the second convolution operation on the neighboring channels.

The processor may perform the second convolution operation on a plurality of input channels using a filter with the width of K, thereby performing the neural network operation based on information of the neighboring channels.

The distance determined by the processor to perform the second convolution operation may be the preset distance or a distance that is double the preset distance. For example, Equation 3 may indicate a case of performing the second convolution operation by taking, as the second input vector, neighboring vectors that are separate from the first input vector in the channel direction by a distance less than or equal to K/2 before and behind.

The preset distance may have a value less than a dimension of the input vector. That is, K is less than D.

When performing the simple convolution operation as represented by Equation 3 above, the size of parameters may increase from T'D to T'DK. Here, the size of D may have a unit of several hundred as described above, and thus the number of parameters in the case using Equation 3 may still be less than the size of parameters used for a general depth-wise convolution operation.

For example, the processor may use 9, 3, and 12 as T', K, and N, respectively, in Equation 3. In this example, the processor may reduce the operation amount by ¼ by using the simple depth-wise convolution, compared to a typical convolution operation.

The processor may additionally apply an activation operation to the term $X^l * W^l + b^l$ in Equation 1. For example, the processor may apply a ReLU operation to $X^l * W^l + b^l$.

Figure 5:
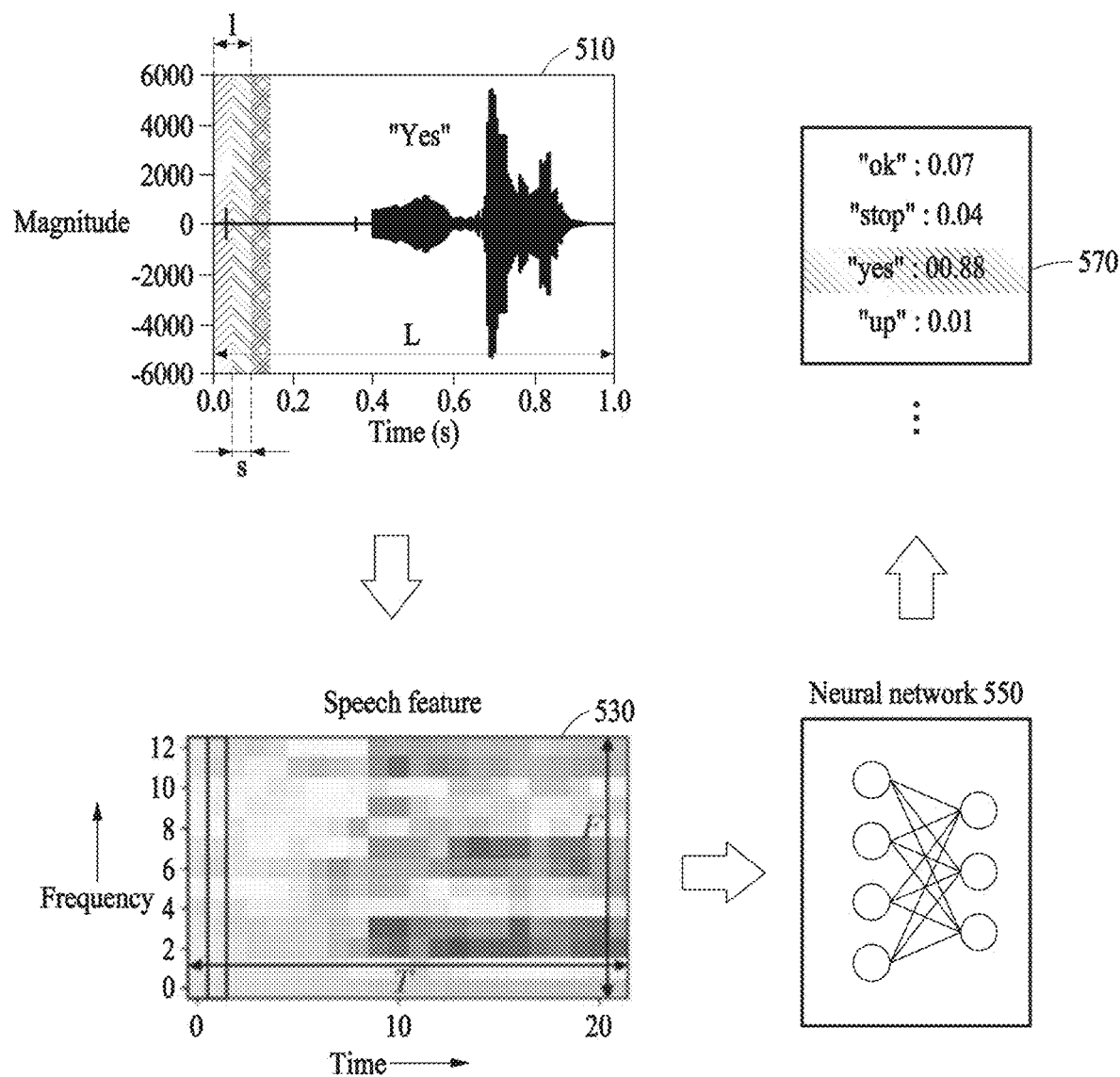
FIG. 5 illustrates an example of keyword spotting performed by a keyword spotting apparatus.
Figure 6:
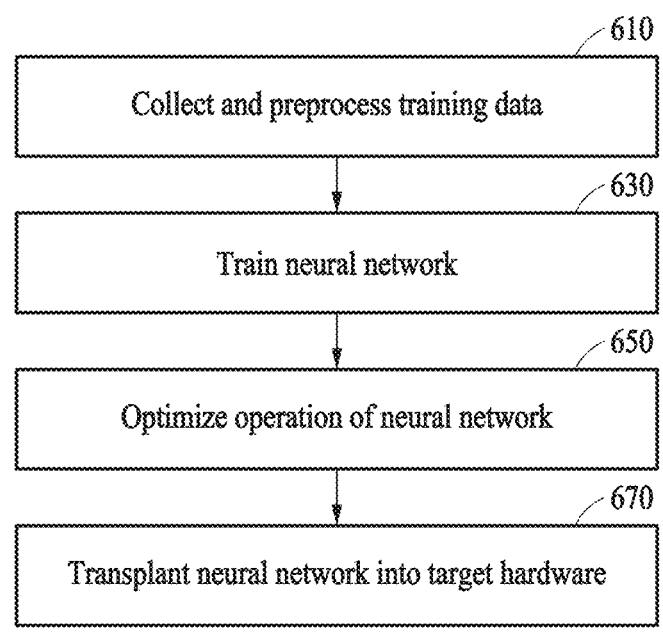
FIG. 6 illustrates an example of a neural network processing method to detect a neural network.

FIG. 5 illustrates an example of keyword spotting performed by a keyword spotting apparatus (for example, the keyword spotting apparatus 30 of FIG. 2). FIG. 6 illustrates an example of a neural network processing method to detect a neural network.

Referring to FIGS. 5 and 6, the receiver 400 may receive a natural language. The natural language may include a speech signal 510 illustrated in FIG. 5. The speech signal 510 may have a magnitude that changes over time.

The processor 500 may detect a keyword 570 from the natural language. The processor 500 may detect the keyword 570 from the natural language using a simple convolution operation described above.

The processor 500 may extract a speech feature 530 based on the speech signal 510. The processor 500 may extract the speech feature 530 by processing the speech signal 510 based on a frequency. The speech feature 530 may correspond to a frequency feature that changes over time.

The processor 500 may detect the keyword 570 by processing the speech feature 530 using a neural network 550.

The processor 500 may train the neural network 550 for keyword extraction. Referring to FIG. 6, in operation 610, the processor 500 may collect training data using the natural language and preprocesses the collected training data.

In operation 630, the processor 500 may train the neural network 550 using the training data including the natural language and the detected keyword 570.

In operation 650, the processor 500 may optimize an operation of the trained neural network 550. Through such optimization, the processor 500 of one or more embodiments may reduce a response time of the neural network 550 and usage of the memory 600. For example, the processor 500 may optimize the operation by applying quantization that changes a form of a weight of the neural network 550 and data used for the operation from a floating-point form to an 8-bit and 32-bit integer form.

In operation 670, the processor 500 may transplant the optimized neural network 550 into target hardware. For example, after the processor 500 performs the training and the optimization of the neural network 550, the processor 500 may transplant the neural network 550 into separate target hardware different from the processor 500, and perform keyword spotting in the target hardware.

The processor 500 may optimize the neural network 550 that is trained according to the target hardware in which keyword spotting is performed. For example, in a case in which the target hardware performing keyword spotting is an ARM CPU, it is possible to improve an operation speed through NEON single instruction multiple data (SIMD)-based implementation.

In addition, in a case in which hardware supporting a floating-point of 16-bit half-precision is a target, the processor 500 may change a 32-bit floating-point operation to half-precision to reduce memory usage and operation time.

The processor 500 may apply quantization with 2 to 4-bit low precision. Alternatively, the processor 500 may apply pruning and such to remove a feature dimension of small scale, thereby reducing the size of the neural network 550.

Figure 7:
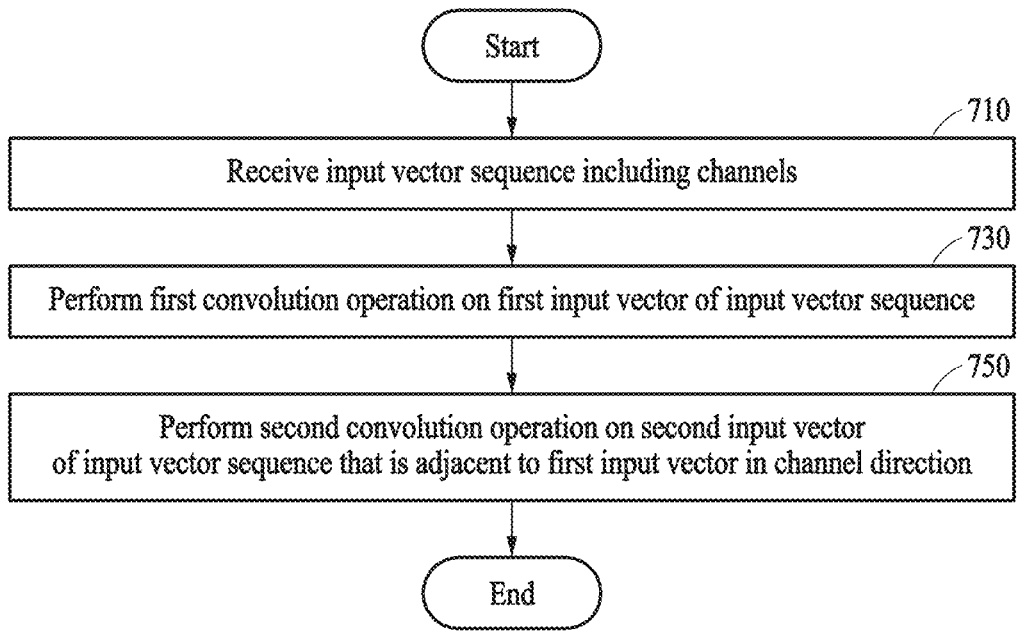
FIG. 7 illustrates an example of a flow of operations performed by a neural network operation apparatus.

FIG. 7 illustrates an example of a flow of operations performed by a neural network operation apparatus (for example, the neural network operation apparatus 10 of FIG. 1).

Referring to FIG. 7, in operation 710, the receiver 100 may receive an input vector sequence including a plurality of channels.

In operation 730, the processor 200 may perform a first convolution operation on a first input vector of the input vector sequence. For example, the processor 200 may perform a temporal convolution on the first input vector with a filter having a preset length on a time axis.

In operation 750, the processor 200 may perform a second convolution operation on a second input vector of the input vectors sequence that is adjacent to the first input vector in a channel direction. For example, the processor 200 may perform the second convolution operation on at least one second input vector that is separate from the first input vector in the channel direction by a distance less than or equal to a preset distance. The preset distance may have a value less than a dimension of the first input vector.

The first convolution operation and the second convolution operation may each include a 1D convolution operation.

The processor 200 may perform a batch normalization operation based on a result of the second convolution operation. The processor 200 may perform a first activation operation based on a result of the batch normalization operation. For example, the processor 200 may perform a ReLU operation based on the result of the batch normalization operation.

The processor 200 may add the first input vector and a result of the first activation operation. The processor 200 may perform a second activation operation based on a result of the adding.

The processor 200 may perform a pooling operation based on a result of the second activation operation. The processor 200 may perform a fully-connected operation based on a result of the pooling operation.

Figure 8:
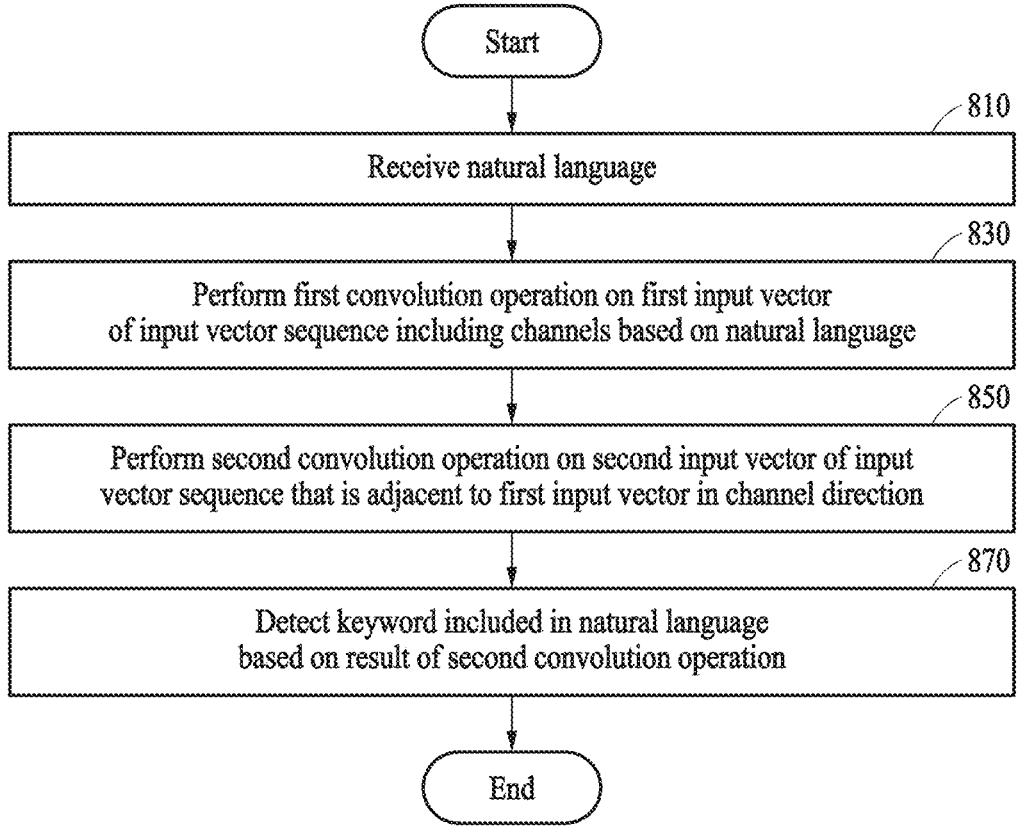
FIG. 8 illustrates an example of a flow of operations performed by a keyword spotting apparatus.

FIG. 8 illustrates an example of a flow of operations performed by a keyword spotting apparatus (for example, the keyword spotting apparatus 30 of FIG. 2).

Referring to FIG. 8, in operation 810, the receiver 400 receives a natural language. In operation 830, the processor 500 may perform a first convolution operation on a first input vector of an input vector sequence including a plurality of channels based on the natural language.

For example, the processor 500 may generate the input vector sequence by extracting a feature from the natural language. The processor 500 may perform the first convolution operation on the first input vector of the generated input vector sequence. For example, the processor 200 may perform a temporal convolution on the first input vector with a filter having a preset length on a time axis.

In operation 850, the processor 500 may perform a second convolution operation on a second input vector of the input vector sequence that is adjacent to the first input vector in a channel direction. For example, the processor 500 may perform the second convolution operation on at least one second input vector that is separate from the first input vector by a distance less than or equal to a preset distance in the channel direction. The preset distance may have a value less than a dimension of the first input vector.

The first convolution operation and the second convolution operation may include a 1D convolution operation.

In operation 870, the processor 500 may detect a keyword included in the natural language based on a result of the second convolution operation.

For example, the processor 500 may perform a batch normalization operation based on a result of the second convolution operation. The processor 200 may perform a first activation operation based on a result of the batch normalization operation. The processor 200 may perform a ReLU operation based on the result of the batch normalization operation.

The processor 500 may add the first input vector and a result of the first activation operation. The processor 500 may perform a second activation operation based on a result of the adding.

The processor 500 may perform a pooling operation based on a result of the second activation operation. The processor 500 may perform a fully-connected operation based on a result of the pooling operation.

The processor 500 may then detect the keyword based on a result of the fully-connected operation.

The neural network operation apparatuses, keyword spotting apparatuses, receivers, processors, memories, neural network operation apparatus 10, receiver 100, processor 200, memory 300, keyword spotting apparatus 30, receiver 400, processor 500, memory 600, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A neural network operation method, comprising:
   receiving an input vector sequence including a plurality of channels;
   performing a first convolution operation on a first input vector of the input vector sequence; and
   performing a second convolution operation on a second input vector of the input vector sequence that is adjacent to and separate from the first input vector as determined by a preset distance in a channel direction.

2. The method of claim 1, wherein the performing of the first convolution operation comprises:
   performing a temporal convolution on the first input vector with a filter having a preset length on a time axis.

3. The method of claim 1, wherein the first convolution operation and the second convolution operation respectively include a one-dimensional (1D) convolution operation.

4. The method of claim 1, wherein the performing of the second convolution operation comprises:
   performing the second convolution operation on one or more second input vectors, including the second input vector, that are separate from the first input vector by a distance less than or equal to the preset distance in the channel direction.

5. The method of claim 4, wherein the preset distance has a value less than a dimension of the first input vector.

6. The method of claim 1, further comprising:
   performing a batch normalization operation based on a result of the second convolution operation; and
   performing a first activation operation based on a result of the batch normalization operation.

7. The method of claim 6, wherein the performing of the first activation operation comprises:
   performing a rectified linear unit (ReLU) operation based on the result of the batch normalization operation.

8. The method of claim 6, further comprising:
   adding the first input vector and a result of the first activation operation; and
   performing a second activation operation based on a result of the adding.

9. The method of claim 8, further comprising:
   performing a pooling operation based on a result of the second activation operation; and
   performing a fully-connected operation based on a result of the pooling operation.

10. A non-transitory computer-readable storage medium storing instructions that, when executed by a processor, configure the processor to perform the method of claim 1.

11. A neural network operation apparatus, comprising:
    a receiver configured to receive an input vector sequence including a plurality of channels; and
    a processor configured to:
    perform a first convolution operation on a first input vector of the input vector sequence; and
    perform a second convolution operation on a second input vector of the input vector sequence that is adjacent to and separate from the first input vector as determined by a preset distance in a channel direction.

12. The apparatus of claim 11, wherein, for the performing of the first convolution operation, the processor is configured to:
    perform a temporal convolution on the first input vector with a filter having a preset length on a time axis.

13. The apparatus of claim 11, wherein the first convolution operation and the second convolution operation respectively include a one-dimensional (1D) convolution operation.

14. The apparatus of claim 11, wherein, for the performing of the second convolution operation, the processor is configured to:

perform the second convolution operation on one or more second input vectors, including the second input vector, that are separate from the first input vector by a distance less than or equal to the preset distance in the channel direction.

15. The apparatus of claim 14, wherein the preset distance has a value less than a dimension of the first input vector.

16. The apparatus of claim 11, wherein the processor is configured to:
perform a batch normalization operation based on a result of the second convolution operation; and
perform a first activation operation based on a result of the batch normalization operation.

17. The apparatus of claim 16, wherein the processor is configured to:
perform a rectified linear unit (ReLU) operation based on the result of the batch normalization operation.

18. The apparatus of claim 16, wherein the processor is configured to:
add the first input vector and a result of the first activation operation; and
perform a second activation operation based on a result of the adding.

19. The apparatus of claim 18, wherein the processor is configured to:
perform a pooling operation based on a result of the second activation operation; and
perform a fully-connected operation based on a result of the pooling operation.

20. A keyword spotting method comprising:
receiving a natural language;
performing a first convolution operation on a first input vector of an input vector sequence including a plurality of channels based on the received natural language;
performing a second convolution operation on a second input vector of the input vector sequence that is adjacent to and separate from the first input vector as determined by a preset distance in a channel direction; and
detecting a keyword included in the natural language based on a result of the second convolution operation.

21. The method of claim 20, wherein the performing of the first convolution operation comprises:
generating the input vector sequence by extracting a feature from the natural language.

22. A neural network operation method, comprising:
performing a first convolution and a second convolution respectively on a first input vector and second input vector of an input vector sequence, wherein the first and second input vectors are separated from each other as determined by a preset distance in a channel direction;
performing a first activation based on the second convolution;
adding the first input vector and a result of the first activation;
performing a second activation based on the adding; and
performing a fully-connected operation based on the second activation.

23. The method of claim 22, wherein the performing of the first activation comprises:
performing a batch normalization based on a result of the second convolution; and
performing the first activation based on a result of the batch normalization.

24. The method of claim 22, wherein the performing of the fully-connected operation comprises:
performing a pooling based on a result of the second activation; and
performing the fully-connected operation based on the result of the pooling.

* * * * *